United States Patent Office 2,882,243
Patented Apr. 14, 1959

2,882,243

MOLECULAR SIEVE ADSORBENTS

Robert M. Milton, Buffalo, N.Y., assignor to Union Carbide Corporation, a corporation of New York No Drawing. Application December 24, 1953
Serial No. 400,388

24 Claims. (Cl. 252—455)

This invention relates to synthetic adsorbent materials and, more particularly, to a synthetic crystalline form of sodium aluminum silicate, its derivatives, and methods of making and activating these adsorbent materials.

It is the principal object of the invention to provide an adsorbent of the molecular sieve type having improved absorbing properties. A further object is to provide a novel crystalline metal aluminum silicate suitable for use as an adsorbent. Still another object of the invention is to provide a synthetic material having unique adsorptive properties and a high adsorptive capacity. Another object of the invention is to provide a convenient and efficient method of making and activating the novel adsorbent of the invention.

Naturally occurring hydrated metal aluminum silicates are called zeolites, and the synthetic materials of the invention have compositions similar to some of the natural zeolites. Accordingly, the term "zeolite" would appear to be appropriately applied to the materials of the invention. There are, however, significant differences between the synthetic and natural materials. To distinguish the one from the other the material of the invention, synthetic crystalline sodium aluminum silicate and its derivatives, will be designated hereinafter by the term "zeolite A."

Certain adsorbents, including zeolite A, which selectively adsorb molecules on the basis of the size and shape of the adsorbate molecule are referred to as molecular sieves. These molecular sieves have a sorption area available on the inside of a large number of uniformly sized pores of molecular dimensions. With such an arrangement molecules of a certain size and shape enter the pores and are adsorbed while larger or differently shaped molecules are excluded. Not all adsorbents behave in the manner of the molecular sieves. Such common adsorbents as charcoal and silica gel, for example, do not exhibit molecular sieve action.

Zeolite A consists basically of a three-dimensional framework of $SiO_4$ and $AlO_4$ tetrahedra. The tetrahedra are cross-linked by the sharing of oxygen atoms so that the ratio of oxygen atoms to the total of the aluminum and silicon atoms is equal to two or $O(Al+Si)=2$. The electrovalence of the tetrahedra containing aluminum is balanced by the inclusion in the crystal of a cation, for example, an alkali or alkaline earth metal ion. This balance may be expressed by the formula $Al_2/(Ca, Sr, Ba, Na_2, K_2)=1$. One cation may be exchanged for another by ion exchange techniques which are described below. The spaces between the tetrahedra are occupied by water molecules prior to dehydration.

Zeolite A may be activated by heating to effect the loss of the water of hydration. The dehydration results in crystals interlaced with channels of molecular dimensions that offer very high surface areas for the adsorption of foreign molecules. These interstitial channels will not accept molecules that have a maximum dimension of the minimum projected cross-section in excess of about 5.5 A. Factors influencing occlusion by the activated zeolite A crystals are the size and polarizing power of the interstitial cation, the polarizability and polarity of the occluded molecules, the dimensions and shape of the sorbed molecule relative to those of the channels, the duration and severity of dehydration and desorption, and the presence of foreign molecules in the interstitial channels. It will be understood that the refusal characteristics of zeolite A are quite as important as the adsorptive or positive adsorption characteristics. For instance, if water and another material are to be separated, it is as essential that the crystals refuse the other material as it is that they adsorb the water.

A feature of the invention is the relatively simple process by which the zeolite A may be prepared. Although there are a number of cations that may be present in zeolite A it is preferred to formulate or synthesize the sodium form of the crystal since the reactants are readily available and water soluble. The sodium in the sodium form of zeolite A may be easily exchanged for other cations as will be shown below. Essentially the preferred process comprises heating a proper mixture in aqueous solution of the oxides, or of materials whose chemical compositions can be completely represented as mixtures of the oxides, $Na_2O$, $Al_2O_3$, $SiO_2$, and $H_2O$, suitably at a temperature of about 100° C. for periods of time ranging from 15 minutes to 90 hours or longer. The product which crystallizes from the hot-mixture is filtered off and washed with distilled water until the effluent wash water in equilibrium with the zeolite has a pH of from about 9 to 12. The material, after activation, is ready for use as a molecular sieve.

Zeolite A may be distinguished from other zeolites and silicates on the basis of its X-ray powder diffraction pattern. The X-ray patterns for several of the ion exchanged forms of zeolite A are described below. Other characteristics that are useful in identifying zeolite A are its composition and density.

The basic formula for all crystalline zeolites where "M" represents a metal and "$n$" its valence may be represented as follows:

$$M_{2/n}O : Al_2O_3 : XSiO_2 : YH_2O$$

In general a particular crystalline zeolite will have values for X and Y that fall in a definite range. The value X for a particular zeolite will vary somewhat since the aluminum atoms and the silicon atoms both occupy essentially equivalent positions in the lattice. Minor variations in the relative numbers of these atoms do not significantly alter the crystal structure or physical properties of the zeolite. For zeolite A, numerous analyses have shown that an average value for X is about 1.85. The X value falls within the range 1.85±0.5.

The value of Y likewise is not necessarily an invariant for all samples of zeolite A particularly among the various ion exchanged forms of zeolite A. This is true because various exchangeable ions are of different size, and, since there is no major change in the crystal lattice dimensions upon ion exchange, more or less space should be available in the pores of the zeolite A to accommodate water molecules. For instance, sodium zeolite A was partially exchanged with magnesium, and lithium, and the pore volume of these forms, in the activated condition, measured with the following results:

| Ion exchanged form of Zeolite A | Percent Na ions replaced | Value of Y |
|---|---|---|
| Na | 0 | 5.1 |
| Mg | 75 | 5.8 |
| K | 95 | 4 |
| Ca | 93 | 5 |

The average value for Y thus determined for the fully hydrated sodium zeolite A was 5.1; and in varying conditions of hydration, the value of Y can vary from 5.1 to essentially zero. The maximum value of Y has been found in 75% exchanged magnesium zeolite A, the fully hydrated form of which has a Y value of 5.8. In general an increase in the degree of ion exchange of the magnesium form of zeolite A results in an increase in the Y value. Larger values, up to 6, may be obtained with more fully ion exchanged materials.

In zeolite A synthesized according to the preferred procedure, the ratio $Na_2O/Al_2O_3$ should equal one. But if all of the excess alkali present in the mother liquor is not washed out of the precipitated product, analysis may show a ratio greater than one, and if the washing is carried too far, some sodium may be ion exchanged by hydrogen, and the ratio will drop below one. Thus, a typical analysis for a thoroughly washed sodium zeolite A is $0.99Na_2O:1.0Al_2O_3:1.85SiO_2:5.1H_2O$. The ratio $Na_2O/Al_2O_3$ has varied as much as 23%. The composition for zeolite A lies in the range of $$\frac{M_2O}{n} / Al_2O_3 = 1.0 \pm 0.2$$

where "M" represents a metal and "$n$" its valence.

Thus the formula for zeolite A may be written as follows:

$$1.0 \pm 0.2 \frac{M_2O}{n} : Al_2O_3 : 1.85 \pm 0.5 SiO_2 : YH_2O$$

In this formula "M" represents a metal, "$n$" its valence, and "Y" may be any value up to 6 depending on the identity of the metal and the degree of dehydration of the crystals.

The pores of zeolite A are normally filled with water and in this case, the above formula represents their chemical analysis. When other materials as well as water are in the pores of zeolite A, chemical analysis will show a lower value of Y and the presence of other adsorbates. The presence in the pores of non-volatile materials, such as sodium chloride and sodium hydroxide, which are not removable under normal conditions of activation at temperatures of from 100° C. to 650° C. does not significantly alter the crystal lattice or structure of zeolite A although it will of necessity alter the chemical composition.

The apparent density of fully hydrated samples of zeolite A were determined by the flotation of the crystals on liquids of appropriate densities. The technique and liquids used are discussed in an article entitled "Density of Liquid Mixture" appearing in Acta Crystallographica, 1951, vol. 4, page 565. The densities of several such crystals are as follows:

| Form of zeolite A | Percent of exchange | Density, g./cc. |
|---|---|---|
| Sodium | 100 | 1.99±0.1. |
| Lithium | 65 | 1.92±0.1. |
| Potassium | 95 | 2.08±0.1. |
| Cesium | 31 | 2.26±0.1. |
| Magnesium | 75 | 2.04±0.1. |
| Calcium | 93 | 2.05±0.1. |
| Thallous | 80 | About 3.36. |

In making the sodium form of zeolite A, representative reactants are silica gel, silicic acid or sodium silicate as a source of silica. Alumina may be obtained from activated alumina, gamma alumina, alpha alumina, alumina trihydrate, or sodium aluminate. Sodium hydroxide may supply the sodium ion and in addition assist in controlling the pH. Preferably the reactants are water soluble. A solution of the reactants in the proper proportions is placed in a container, suitably of metal or glass. The container is closed to prevent loss of water and the reactants heated for the required time. A convenient and preferred procedure for preparing the reactant mixture is to make an aqueous solution containing the sodium aluminate and hydroxide and add this, preferably with agitation, to an aqueous solution of sodium silicate. The system is stirred until homogeneous or until any gel which forms is broken into a nearly homogeneous mix. After this mixing, agitation may be stopped as it is unnecessary to agitate the reacting mass during the formation and crystallization of the zeolite, however, mixing during formation and crystallization has not been found to be detrimental. The initial mixing of ingredients is conveniently done at room temperature but this is not essential.

A crystallization temperature of about 100° C. has been found to be particularly advantageous in this process. The temperature is easy to maintain. It is high enough to effectively promote the reaction and yet low enough to yield crystals with a high water content which, upon activation, have a high adsorbing capacity. Satisfactory results have been obtained with the temperature of the reaction as low as about 21° C. and as high as about 150° C., the pressure being atmospheric or at least that corresponding to the vapor pressure of water in equilibrium with the mixture at the higher temperature. Any suitable heating apparatus, for example an oven, sand bath, oil bath, or jacketed autoclave may be used. For convenience, in laboratory work, glass vessels containing the reactants are held immersed in a bath of boiling water giving a temperature of about 100° C. In quantity production, steam jacketed vessels offer a convenient means of controlling the temperature. For temperatures between room temperature (21° C.) and 150° C., increasing the reaction temperature increases the rate of reaction and decreases the reaction period. For example, sodium zeolite A is obtained in 6 days at 21° C., in about 45 minutes at 100° C., and even faster at 150° C. Once the zeolite crystals have formed they maintain their structure, and holding the reaction temperature for a longer time than is necessary for the maximum yield of crystals does no harm. For instance, zeolite A which may be completely crystallized within 6 hours at 100° C. can remain in contact with the mother liquor at 100° C. for an additional 50 to 100 hours with no apparent change in yield or crystal structure.

After the reaction period, the zeolite crystals are filtered off. The reaction magma may be filtered at the reaction temperature if desired but hot magmas are preferably cooled to room temperature before filtering. The filtrate, or mother liquor, may be reused after enrichment with the proper amounts of reactants to give a properly proportioned reactant mixture. The mass of zeolite crystals is washed (preferably with distilled water and conveniently in the filter) until the effluent wash water, in equilibrium with the zeolite has a pH of between 9–12.

Thereafter, the crystals are dried, conveniently in a vented oven at a temperature of between about 25° C. and 150° C. For X-ray and chemical analysis, this drying is sufficient. In practical use, there need be no separate drying step as the zeolites will dry as they are activated. The individual crystals of the synthetic zeolite A usually appear to be cubic. Most of the crystals have a size in the range 0.1 micron to 10 microns, but smaller and larger crystals can occur covering the size range of 0.01 micron to 100 microns.

In the synthesis of zeolite A, it has been found that the composition of the reacting mixture is critical. The crystallizing temperature and the length of time the crystallizing temperature is maintained are important variables in determining the yield of crystalline material. Under some conditions, for example too low a temperature for too short a time, no crystalline materials are produced. Extreme conditions may also result in the production of materials other than zeolite A.

Specific examples of the production of the sodium form of zeolite A are given in Table I below. The mixtures and treatments described resulted in essentially pure crystalline zeolite A except in runs 12 and 13 in which from 5% to 10% of another crystalline form of sodium aluminum silicate was mixed with the zeolite A. In run 3 and subsequent runs the term "solution S" refers to a water solution of sodium silicate containing approximately 7.5% by weightt $Na_2O$ and 25.8% by weight $SiO_2$.

TABLE I

| Run No. | Reactants | Temp. (°C.) | Duration (hrs.) | Ratio of oxides $SiO_2/Al_2O_3$ | $Na_2O/SiO_2$ | $H_2O/Na_2O$ |
|---|---|---|---|---|---|---|
| 1 | 30 gm. silica gel+41 gm. $NaAlO_2$+excess water to a pH of about 13.5 | 100 | 92 | 1.8 | 0.56 | |
| 2 | 1 part by weight $NaAlO_2$+0.92 part by weight silicic acid+water to a pH of about 13.5. | 100 | 76 | 2.0 | 0.5 | |
| 3 | 80 gm. $NaAlO_2$+126 gm. "Solution S"+320 cc. $H_2O$. | 100 | 12 | 1.2 | 1.2 | 36 |
| 4 | 15 gm. $NaAlO_2$+19.7 gm. "Solution S"+1.7 gm. NaOH+76 cc. $H_2O$. | 100 | 39 | 1.0 | 1.6 | 37 |
| 5 | 15 gm. $NaAlO_2$+9.8 gm. "Solution S"+2.5 gm. NaOH+83 cc. $H_2O$. | 100 | 39 | 0.5 | 3.2 | 37 |
| 6 | 45 gm. $NaAlO_2$+63 gm. "Solution S"+160 cc. $H_2O$. | 25 | [1]14 | 1.1 | 1.3 | 33 |
| 7 | 10 gm. alumina trihydrate+18.5 gm. "Solution S"+7.4 gm. NaOH+55 cc. $H_2O$. | 100 | 48 | 1.2 | 1.4 | 37 |
| 8 | 15.0 gm. $NaAlO_2$+23.3 gm. "Solution S"+75.0 cc. $H_2O$. | 100 | 1 | 1.2 | 1.2 | 43 |
| 9 | 9 gm. $NaAlO_2$+23.4 gm. "Solution S"+9.7 gm. NaOH+197 cc. $H_2O$. | 100 | 66 | 2.0 | 2.0 | 59 |
| 10 | 17.9 gm. $NaAlO_2$+39.4 gm. "Solution S"+125 cc. $H_2O$. | 100 | 62 | 1.7 | 0.95 | 52 |
| 11 | 30 gm. $NaAlO_2$+47 gm. "Solution S"+125 gm. $H_2O$. | 120 | 8 | 1.2 | 1.2 | 36 |
| 12 | 11.4 gm. $NaAlO_2$, 17.9 gm. "Solution S", 47.6 gm. $H_2O$. | 150 | 2½ | 1.2 | 1.2 | 36 |
| 13 | 30 gm. $NaAlO_2$, 46.5 gm. "Solution S", 150 gm. $H_2O$, 4 gm. NaOH. | 50 | 112 | 1.2 | 1.4 | 36 |

[1] Days.

The sodium form of zeolite A has been produced at 100° C., essentially free from contaminating materials, from reacting mixtures whose compositions, expressed as mixtures of the oxides, fall within either of the following ranges.

| | Range 1 | Range 2 |
|---|---|---|
| $SiO_2/Al_2O_3$ | 0.5–1.3 | 1.3–2.5 |
| $Na_2O/SiO_2$ | 1.0–3.0 | 0.8–3.0 |
| $H_2O/Na_2O$ | 35–200 | 35–200 |

Zeolite A has also been produced, in admixture with other crystalline sodium aluminum silicates and crystalline alumina, from reactants in proportions outside the above ranges. For instance, zeolite A has been produced in admixture with another crystalline form of sodium aluminum silicate by holding at 100° C. reacting mixtures whose compositions, expressed as mixtures of the oxides, fall within the following ranges.

| | Range 1 | Range 2 |
|---|---|---|
| $SiO_2/Al_2O_3$ | 0.06–3.4 | 0.06–3.4 |
| $Na_2O/SiO_2$ | 0.7–3.0 | 3.0–20 |
| $H_2O/Na_2O$ | 4–35 | 4–60 |

Similarly zeolite A, mixed with still another crystalline form of sodium aluminum silicate, has been produced by holding at 100° C. reaction mixtures whose compositions, expressed as oxide ratios, fall within the following range.

$SiO_2/Al_2O_3$ _____ 1.5–3.0
$Na_2O/SiO_2$ _____ 0.9–1.5
$H_2O/Na_2O$ _____ 35–200

Similarly, zeolite A mixed with crystalline alumina trihydrate has been produced at 100° C. from reaction mixtures whose compositions, expressed as oxide ratios, fall within the following range.

$SiO_2/Al_2O_3$ _____ 0.06–0.13
$Na_2O/SiO_2$ _____ 9–18
$H_2O/Na_2O$ _____ 39–50

Zeolite A has also been produced, mixed with yet another crystalline form of sodium aluminum silicate, by holding at 100° C. a reaction mixture of the following initial composition.

$SiO_2/Al_2O_3$ _____ 3.4
$Na_2O/SiO_2$ _____ 1.8
$H_2O/Na_2O$ _____ 28

When zeolite A has been prepared, mixed with other materials, the X-ray pattern of the mixture can be reproduced by a simple proportional addition of the X-ray patterns of the individual pure components.

Other properties, for instance molecular sieve selectivity, characteristic of zeolite A are present in the properties of the mixture to the extent that zeolite A is part of the mixture.

The adsorbents contemplated herein include not only the sodium form of zeolite A as synthesized above from a sodium-aluminum-silicate-water system with sodium as the exchangeable cation but also crystalline materials obtained from such a zeolite by partial or complete replacement of the sodium ion with other cations. The sodium cations can be replaced, at least in part, by other ions. These replacing ions can be classified in the following groups: other monovalent or divalent cations, such as lithium and magnesium; metal ions in group I of the periodic table such as potassium and silver; group II metal ions such as calcium, and strontium; metal ions of the transition metals such as nickel; and other ions, for example, hydrogen and ammonium, which with zeolite A behave like metals in that they can replace metal ions without causing any appreciable change in the basic structure of the zeolite crystal. The transition metals are those whose atomic numbers are from 21 to 28, from 39 to 46 and from 72 to 78 inclusive, namely, scandium, titanium, vanadium, chromium, manganese, iron, cobalt, nickel, yttrium, zirconium, niobium, molybdenum, ruthenium, rhodium, palladium, hafnium, tantalum, tungsten, rhenium, osmium, iridium and platinum.

The spatial arrangement of the aluminum, silicon and oxygen atoms which make up the basic crystal lattice of the zeolite remains essentially unchanged by partial or complete substitution of the sodium ion by other cations. The X-ray patterns of the ion exchanged forms of the zeolite A show the same principal lines at essentially the same positions, but there are some differences in the relative intensities of the X-ray lines, due to the ion exchange.

Ion exchange of the sodium form of zeolite A (which for convenience may be represented as $Na_2A$) or other forms of zeolite A may be accomplished by conventional ion exchange methods. A preferred continuous method is to pack zeolite A into a series of vertical columns with suitable supports at the bottom; successively pass through the beds a water solution of a soluble salt of the cation to be introduced into the zeolite; and change the flow from the first bed to the second bed as the zeolite in the first bed becomes ion exchanged to the desired extent.

To obtain hydrogen exchange, a water solution of an acid such as hydrochloric acid is effective as the exchanging solution. For sodium exchange, a water solution of sodium chloride is suitable. Other convenient reagents are: for potassium exchange, a water solution of potassium chloride or dilute potassium hydroxide (pH not over about 12); for lithium, magnesium, calcium, ammonium, nickel, or strontium exchange, water solutions of the chlorides of these elements; for zinc exchange, a water solution of zinc nitrate; and for silver exchange, a silver nitrate solution. While it is more convenient to use water soluble compounds of the exchange cations, other solutions containing the desired cations or hydrated cations may be used.

In a typical case of batch-wise exchange, a solution of 7.8 grams of calcium chloride in 750 cc. of distilled water was added with stirring to a beaker containing 25 grams of hydrated sodium zeolite A ($Na_2A$). After four days at room temperature the supernatant liquid was decanted and another 750 cc. of distilled water containing 7.8 grams of calcium chloride was added with stirring. After one day at room temperature the supernatant liquid was again decanted, and another 750 cc. of distilled water containing 7.8 grams of calcium chloride was added with stirring. One day later the supernatant liquid was decanted and 750 cc. of distilled water was added with stirring. After another day at room temperature this supernatant liquid was again decanted and the zeolite A dried. Chemical analysis of the exchanged zeolite showed that 85% of the sodium ions had been replaced by calcium ions in the ratio of one calcium ion to two sodium ions.

In another case, 25 grams of hydrated sodium zeolite A ($Na_2A$) were put into a beaker and 750 cc. of distilled water containing 21 grams of potassium chloride was added with stirring. Four days later the supernatant liquid was decanted and another 750 cc. portion of the same concentration of potassium exchange solution was added. A day later this process was repeated, and after still another day, the supernatant liquid was again decanted and 750 cc. of distilled water added. The chemical analysis of the zeolite A so exchanged showed that 91% of the sodium ions had been replaced with potassium ions.

In a column exchange, 33 grams of sodium zeolite A ($Na_2A$) were packed into a glass column having a diameter of two centimeters and a fritted glass disk as a bottom support for the zeolite bed. A solution made by dissolving 10 grams of calcium chloride in two liters of distilled water was passed through the bed. After passage of the solution, the zeolite was removed from the column and dried. Chemical analysis showed that 66% of the sodium ions had been replaced by calcium ions.

The extent to which ion exchange occurs may be controlled. For instance, calcium exchange for sodium has been effected in amounts of from 5% or less to complete replacement of the sodium ion. One procedure for controlling the degree of exchange is to soak a known quantity of sodium zeolite A in solutions containing predetermined amounts of exchangeable ions. In one series of experiments with sodium zeolite A and calcium ions, when the total calcium available in the solution was 5% of the amount which could enter the zeolite A if all the sodium were replaced, it was found that 5% of the sodium ions actually were replaced in 20 minutes' contact time at room temperature. When the exchange solution contained 60% of the theoretical amount of calcium required for complete exchange, 47% of the sodium ions were actually replaced in 20 minutes at room temperature. Using three times the amount of calcium theoretically required to make a complete exchange, the replacement of 77% of the sodium ions actually took place at room temperature within 20 minutes. More complete exchange can be obtained if the temperature is raised to 100° C. or if the exchange operation is repeated several times by replacing the spent exchange solution with a fresh solution. A completely exchanged calcium zeolite A (CaA) is obtained by a combination of heating and repeating the exchange operation.

The rate of exchange of sodium zeolite A can under some conditions be quite rapid. For instance, when sodium zeolite A was put into a solution 0.1 molar in calcium ions, 47% of the sodium ions were replaced in a two minute contact time at 25° C., and in 7½ minutes the exchange was 59% complete. Under these conditions of solution concentration, about 60% was the maximum exchange achievable.

Hydrogen ion exchange of zeolite A is obtained by treating the zeolite A with water or acid. When sodium zeolite A is put into distilled water, the pH rises to between about 10 and 11 indicating that hydrogen ions from the water enter the lattice and displace some sodium ions. This displacement occurs according to the following equation:

$$Na_2A + 2H^+ \rightleftharpoons H_2A + 2Na^+$$

Four grams of sodium zeolite A ($Na_2A$) in 60 cc. of water, gave an equilibrium pH of 10. When sodium chloride was added to the mixture of water and sodium zeolite A the pH fell. On adding enough sodium chloride to the above equilibrium to make a 0.01 M solution, the pH dropped to 9. Still further addition of sodium chloride reduced the pH to 8.3 indicating a mass action effect of the sodium chloride on the equilibrium.

To hasten and to effect more completely the hydrogen ion exchange, an acid should be substituted for the water. Upon addition of increments of aqueous hydrochloric acid to a mixture of sodium zeolite A and water, the pH of the water solution fell steadily from 10½ to about 3.8. Further additions of acid gave no further lowering of the pH value, and a good zeolite A X-ray pattern was shown by the product.

The pH of dilute hydrochloric acid to which sodium zeolite A powder is added rises from about 1 to about 3.8 after which the pH remains constant. In one case 550 cc. of a 0.1 normal solution of hydrochloric acid was added to 10 grams of sodium zeolite A in small increments. Upon the slow addition of the first 110 cc., the pH rose to about 3.8. Upon the addition of the remaining 440 cc., no further change in pH was noted and X-ray examination of the product showed a strong zeolite A pattern.

When the amount of acid added to sodium zeolite A supplies the theoretical amount of hydrogen ion to completely replace the sodium ions, the product is primarily hydrogen exchanged zeolite A. If acid is added in excess of the amount theoretically required to permit complete exchange, the zeolite structure is destroyed, but the pH remains at about 3.8 throughout the process. For instance, 275 cc. of 0.1 normal solution of hydrochloric acid was added to 5 grams of sodium zeolite A. This was approximately the theoretical amount of acid to give complete hydrogen exchange. Then 200 cc. more of the solution was added. The pH remained at 3.8. X-ray analysis showed a complete destruction of all crystal structure.

Hydrogen exchanged zeolite A may in turn be exchanged to sodium zeolite A, at least partially, by adding dilute sodium hydroxide to hydrogen zeolite A. X-ray and adsorption tests show the material so treated to contain sodium zeolite A.

Among the ways of identifying zeolite A and distinguishing it from other zeolites and other crystalline substances, the X-ray powder diffraction pattern has been found to be a useful tool. In obtaining the X-ray diffraction powder patterns, standard techniques were employed. The radiation was the Kα doublet of copper, and a Geiger counter spectrometer with a strip chart pen recorder was used. The peak heights, I, and the positions as a function of $2\theta$, where $\theta$ is the Bragg angle, were read from the spectrometer chart. From these, the relative intensities, $$\frac{100I}{I_0}$$

where $I_0$ is the intensity of the strongest line or peak, and $d$(obs), the interplanar spacing in A., corresponding to the recorded lines were calculated.

X-ray powder diffraction data for a sodium zeolite A (Na$_2$A), a 95% exchanged potassium zeolite A (K$_2$A), a 93% exchanged calcium zeolite A (CaA), a 94% exchanged lithium zeolite A (Li$_2$A), a 93% exchanged strontium zeolite A (SrA), and an exchanged thallium zeolite A (Tl$_2$A) are given in Table A. The table lists the 100 $I/I_0$ and the $d$ values in A. for the observed line for the different forms of zeolite A. The X-ray patterns indicate a cubic unit cell of $a_0$ of between 12.0 and 12.4 A. In a separate column are listed the sum of the squares of the Miller indices $(h^2+k^2+l^2)$ for a cubic unit cell that corresponds to the observed lines in the X-ray diffraction patterns. The $a_0$ values for each particular zeolite are also tabulated and in another column the estimated errors in reading the position of an X-ray peak on the spectrometer chart appear.

The relative intensities and the positions of the lines are only slightly different for these various ion exchanged forms of zeolite A. The patterns show substantially all of the same lines, and all meet the requirements of a cubic unit cell of approximately the same size. The spatial arrangement of silicon- oxygen- and aluminum atoms, i.e. the arrangement of the AlO$_4$ and SiO$_4$ tetrahedra, are essentially identical in all the forms of zeolite A. The appearance of a few minor lines and the disappearance of others from one form of zeolite A to another as well as slight changes in the intensities and positions of some of the X-ray lines can be attributed to the different sizes and numbers of cations present in the various forms since these differences effect some small expansion or contraction of the crystals.

TABLE A

| $(h^2+k^2+l^2)$ | Na$_2$A | | Li$_2$A | | K$_2$A | | Estimated error in $d$ value, plus or minus |
|---|---|---|---|---|---|---|---|
| | $d$ | 100 $I/I_0$ | $d$ | 100 $I/I_0$ | $d$ | 100 $I/I_0$ | |
| 1 | 12.29 | 100 | 12.04 | 100 | 12.31 | 100 | 0.02 |
| 2 | 8.71 | 69 | 8.51 | 72 | 8.71 | 64 | 0.02 |
| 3 | 7.11 | 35 | 6.96 | 42 | 7.10 | 30 | 0.01 |
| 4 | | | | | 6.15 | 4 | 0.01 |
| 5 | 5.51 | 25 | 5.39 | 25 | 5.50 | 10 | 0.01 |
| 6 | 5.03 | 2 | | | 5.03 | 8 | 0.01 |
| 8 | 4.36 | 6 | 4.26 | 18 | | | 0.01 |
| 9 | 4.107 | 36 | 4.02 | 48 | 4.105 | 33 | 0.004 |
| 10 | | | 3.805 | 4 | 3.895 | 10 | 0.003 |
| 11 | 3.714 | 53 | 3.633 | 53 | 3.714 | 62 | 0.003 |
| 12 | | | | | 3.555 | 5 | 0.003 |
| 13 | 3.417 | 16 | 3.342 | 28 | 3.414 | 34 | 0.003 |
| 14 | 3.293 | 47 | 3.222 | 49 | 3.292 | 35 | 0.003 |
| 16 | | | | | 3.078 | 12 | 0.002 |
| 17 | 2.987 | 55 | 2.923 | 43 | 2.985 | 80 | 0.002 |
| 18 | 2.904 | 9 | 2.837 | 4 | 2.902 | 27 | 0.002 |
| 20 | 2.754 | 12 | 2.691 | 4 | 2.753 | 65 | 0.002 |
| 21 | 2.688 | 4 | 2.628 | 13 | 2.687 | 9 | 0.002 |
| 22 | 2.626 | 22 | 2.569 | 32 | 2.625 | 18 | 0.002 |
| 24 | 2.515 | 5 | 2.457 | 7 | 2.514 | 28 | 0.002 |
| 25 | 2.464 | 4 | 2.408 | 1 | | | 0.002 |
| 26 | | | 2.363 | 8 | 2.415 | 4 | 0.002 |
| 27 | 2.371 | 3 | 2.319 | 5 | 2.370 | 9 | 0.002 |
| 29 | 2.289 | 1 | 2.235 | 3 | 2.287 | 3 | 0.002 |
| 30 | 2.249 | 3 | 2.199 | 3 | 2.248 | 5 | 0.002 |
| 32 | 2.177 | 7 | | | 2.177 | 26 | 0.002 |
| 33 | 2.144 | 10 | 2.097 | 2 | 2.143 | 12 | 0.002 |
| 34 | 2.113 | 3 | 2.064 | 2 | | | 0.001 |
| 35 | 2.083 | 4 | | | 2.081 | 5 | 0.001 |
| 36 | 2.053 | 9 | 2.007 | 20 | 2.053 | 3 | 0.001 |
| 37 | | | 1.980 | 1 | | | 0.001 |
| 38 | | | 1.954 | 2 | 1.998 | 4 | 0.001 |
| 41 | 1.924 | 7 | 1.881 | 8 | 1.922 | 7 | 0.001 |
| 42 | 1.901 | 4 | 1.859 | 2 | 1.900 | 4 | 0.001 |
| 44 | 1.858 | 2 | | | 1.857 | 8 | 0.001 |
| 45 | 1.837 | 3 | 1.795 | 2 | | | 0.001 |
| 49 | 1.759 | 2 | 1.720 | 3 | | | 0.001 |
| 50 | 1.743 | 13 | 1.702 | 10 | 1.742 | 12 | 0.001 |
| 51 | | | 1.686 | 1 | | | 0.001 |

TABLE A (Cont'd)

| $(h^2+k^2+l^2)$ | Na$_2$A | | Li$_2$A | | K$_2$A | | Estimated error in $d$ value, plus or minus |
|---|---|---|---|---|---|---|---|
| | $d$ | 100 $I/I_0$ | $d$ | 100 $I/I_0$ | $d$ | 100 $I/I_0$ | |
| 53 | 1.692 | 6 | 1.653 | 8 | 1.691 | 7 | 0.001 |
| 54 | 1.676 | 2 | | | | | 0.001 |
| 57 | 1.632 | 4 | 1.593 | 3 | 1.631 | 7 | 0.001 |
| 59 | 1.604 | 6 | 1.566 | 3 | 1.603 | 6 | 0.001 |
| 61 | 1.577 | 4 | 1.541 | 5 | 1.576 | 8 | 0.001 |
| 62 | | | 1.529 | 2 | | | 0.001 |
| 65 | 1.528 | 2 | 1.492 | 3 | | | 0.001 |
| 66 | 1.516 | 1 | 1.481 | 2 | | | 0.001 |
| 67 | | | 1.470 | 2 | | | 0.001 |
| 68 | | | 1.459 | 2 | 1.493 | 7 | 0.001 |
| 69 | 1.483 | 3 | 1.449 | 3 | | | 0.001 |
| 70 | 1.473 | 2 | 1.438 | 1 | | | 0.001 |
| 72 | | | 1.417 | 4 | | | 0.001 |
| 74 | 1.432 | 3 | 1.399 | 6 | | | 0.001 |
| 75 | 1.422 | 2 | | | | | 0.001 |
| 77 | 1.404 | 5 | | | 1.403 | 4 | 0.001 |
| 81 | 1.369 | 2 | | | | | 0.001 |
| 82 | 1.360 | 8 | | | 1.359 | 7 | 0.001 |
| $a_0$ | 12.32±0.02 | | 12.04±0.02 | | 12.31±0.02 | | |

| $(h^2+k^2+l^2)$ | CaA | | SrA | | Tl$_2$A | | Estimated error in $d$ value, plus or minus |
|---|---|---|---|---|---|---|---|
| | $d$ | 100 $I/I_0$ | $d$ | 100 $I/I_0$ | $d$ | 100 $I/I_0$ | |
| 1 | 12.24 | 100 | 12.36 | 90 | 12.31 | 13 | 0.02 |
| 2 | 8.66 | 39 | 8.72 | 66 | 8.71 | 8 | 0.02 |
| 3 | 7.08 | 32 | | | 7.11 | 10 | 0.01 |
| 4 | 6.12 | 12 | | | 6.16 | 24 | 0.01 |
| 5 | 5.48 | 20 | | | | | 0.01 |
| 6 | 5.00 | 4 | | | | | 0.01 |
| 8 | | | | | 4.36 | 100 | 0.01 |
| 9 | 4.08 | 35 | | | 4.11 | 7 | 0.004 |
| 10 | 3.875 | 2 | | | | | 0.003 |
| 11 | 3.696 | 34 | 3.714 | 60 | 3.717 | 34 | 0.003 |
| 12 | 3.539 | 4 | 3.556 | 15 | 3.558 | 18 | 0.003 |
| 13 | 3.398 | 18 | 3.415 | 21 | 3.418 | 19 | 0.003 |
| 14 | 3.276 | 38 | 3.292 | 68 | 3.294 | 4 | 0.002 |
| 16 | | | | | 3.081 | 25 | 0.002 |
| 17 | 2.972 | 32 | 2.986 | 100 | 2.990 | 22 | 0.002 |
| 18 | 2.888 | 9 | 2.903 | 38 | 2.906 | 6 | 0.002 |
| 19 | | | | | 2.828 | 1 | 0.002 |
| 20 | 2.741 | 7 | 2.753 | 49 | 2.757 | 51 | 0.002 |
| 21 | 2.676 | 3 | | | | | 0.002 |
| 22 | 2.614 | 24 | 2.625 | 49 | 2.630 | 11 | 0.002 |
| 24 | 2.502 | 7 | | | 2.517 | 55 | 0.002 |
| 25 | 2.451 | 7 | | | 2.466 | 2 | 0.002 |
| 26 | | | | | 2.416 | 2 | 0.002 |
| 27 | 2.359 | 3 | | | | | 0.002 |
| 29 | | | | | 2.291 | 8 | 0.002 |
| 30 | 2.238 | 3 | | | | | 0.002 |
| 32 | 2.166 | 8 | | | 2.182 | 19 | 0.002 |
| 33 | 2.141 | 8 | | | 2.144 | 2 | 0.001 |
| 34 | 2.103 | 5 | | | 2.114 | 2 | 0.001 |
| 35 | 2.074 | 2 | | | | | 0.001 |
| 36 | 2.042 | 4 | | | 2.057 | 11 | 0.001 |
| 40 | | | | | 1.951 | 10 | 0.001 |
| 41 | 1.914 | 4 | | | 1.926 | 3 | 0.001 |
| 42 | 1.891 | 3 | | | | | 0.001 |
| 44 | | | | | 1.860 | 14 | 0.001 |
| 45 | | | | | 1.837 | 2 | 0.001 |
| 46 | | | | | 1.821 | 2 | 0.001 |
| 48 | | | | | 1.779 | 3 | 0.001 |
| 50 | 1.733 | 11 | | | 1.743 | 3 | 0.001 |
| 52 | | | | | 1.710 | 8 | 0.001 |
| 53 | 1.683 | 4 | | | 1.693 | 3 | 0.001 |
| 54 | 1.667 | 2 | | | | | 0.001 |
| 56 | | | | | 1.648 | 9 | 0.001 |
| 57 | 1.623 | 2 | | | 1.633 | 6 | 0.001 |
| 58 | 1.608 | 5 | | | | | 0.002 |
| 61 | 1.569 | 4 | | | 1.578 | 3 | 0.002 |
| 64 | | | | | 1.541 | 2 | 0.002 |
| 68 | | | | | 1.495 | 11 | 0.002 |
| 72 | 1.445 | 2 | | | 1.453 | 5 | 0.002 |
| 74 | 1.425 | 2 | | | 1.433 | 2 | 0.002 |
| 75 | 1.416 | 1 | | | | | 0.002 |
| 76 | | | | | 1.414 | 4 | 0.002 |
| 77 | 1.397 | 3 | | | 1.406 | 2 | 0.002 |
| 82 | 1.353 | 5 | | | | | 0.002 |
| 84 | | | | | 1.346 | 3 | 0.002 |
| $a_0$ | 12.26±0.02 | | 12.32±0.02 | | 12.33±0.02 | | |

In the above table, particularly with reference to SrA, certain values have not been listed since their calculation was not necessary in the determination of the dimensions of the unit cell. The dimension of the edge of the cubic unit cell of the magnesium zeolite A was obtained from data not tabulated above and is 12.29 A.±0.02A.

The more significant $d$ values for zeolite A are given in Table B.

TABLE B $d$ Value of reflection in A.

12.2±0.2
8.6±0.2
7.05±0.15
4.07±0.08
3.68±0.07
3.38±0.06
3.26±0.05
2.96±0.05
2.73±0.05
2.60±0.05

Zeolite A may be defined as a synthetic crystalline aluminum-silicate having an X-ray powder diffraction pattern characterized by at least those reflections set forth in Table B.

Occasionally, additional lines not belonging to the pattern for zeolite A, appear in a pattern along with the X-ray lines characteristic of zeolite A. This is an indication that one or more additional crystalline materials are mixed with zeolite A in the sample being tested. Frequently these additional materials can be identified as initial reactants in the synthesis of the zeolite, or as other crystalline substances. When zeolite A is heat treated at temperatures of between 100 and 600° C. in the presence of water vapor or other gases or vapors, the relative intensities of the lines in the X-ray pattern may be appreciably changed from those existing in the unactivated zeolite A patterns. Small changes in line positions may also occur under these conditions. These changes in no way hinder the identification of these X-ray patterns as belonging to zeolite A.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the A lattice are not to exclude those materials which, due to some variable mentioned or otherwise known to those skilled in the art, fail to show all of the lines, or show a few extra ones that are permissible in the cubic system of the A zeolite, or show a slight shift in position of the lines, so as to give a slightly larger or smaller lattice parameter.

The zeolites contemplated herein exhibit adsorptive properties that are unique among known adsorbents. The common adsorbents, like charcoal and silica gel, show adsorption selectivities based primarily on the boiling point or critical temperature of the adsorbate. Activated zeolite A on the other hand exhibits a selectivity based on the size and shape of the adsorbate molecule. Among those adsorbate molecules whose size and shape are such as to permit adsorption by zeolite A, a very strong preference is exhibited toward those that are polar, polarizable, and unsaturated. Another property of zeolite A that contributes to its unique position among adsorbents is that of adsorbing large quantities of adsorbate either at very low pressures, at very low partial pressures, or at very low concentrations. One or a combination of one or more of these three adsorption characteristics or others can make zeolite A useful for numerous gas or liquid separation processes where adsorbents are not now employed. The use of zeolite A permits more efficient and more economical operation of numerous processes now employing other adsorbents.

Common adsorbents like silica gel and charcoal do not exhibit any appreciable molecular sieve action, whereas the various forms of zeolite A do. This is shown in the following tables for typical samples of the adsorbents. In these tables as well as others in the specification the term "Weight percent adsorbed" refers to the percentage increase in the weight of the adsorbent. The adsorbents were activated by heating them at a reduced pressure to remove adsorbed materials. Throughout the specification the activation temperature for zeolite A was 350° C. and the pressure at which it was heated was less than about 0.1 millimeter of mercury absolute unless otherwise specified. In Tables II, III, and IV the activation temperature is given for each sample. Throughout the specification, unless otherwise indicated, the pressure given for each adsorption is the pressure of the adsorbate at the adsorption conditions.

TABLE II

| Adsorbent | Activation temperature, °C. | Weight percent adsorbed at 25° C. and at 760 mm. Hg | | |
|---|---|---|---|---|
| | | Methane (b.p. −161.5° C.) | Ethane (b.p. −88.3° C.) | Propane (b.p. −44.5° C.) |
| Charcoal | 350 | 2.5 | 10.1 | 17.6 |
| Silica gel | 175 | 0.5 | 1.6 | 6.3 |
| Sodium zeolite A | 350 | 1.6 | 8.0 | 1.2 |

TABLE III

| Adsorbent | Activation temperature, °C. | Weight percent adsorbed at −196° C. | |
|---|---|---|---|
| | | Oxygen at 7 mm. Hg | Nitrogen at 100 mm. Hg |
| Charcoal | 300 | 44 | 40 |
| Silica gel | 175 | 19.9 | 24.9 |
| Sodium zeolite A | 350 | 24.1 | 0.6 |

TABLE IV

| Adsorbent | Activation temperature, °C. | Weight percent adsorbed at 25° C. | |
|---|---|---|---|
| | | n-Butanol at 6 mm. Hg | i-Butanol at 12 mm. Hg |
| Charcoal | 350 | 52.2 | 50.1 |
| Silica gel | 175 | 33.2 | 34.0 |
| Magnesium zeolite A (over 50% exchanged) | 350 | 10.3 | 1.2 |

Table II demonstrates the fact that charcoal and silica gel show a preference toward the straight chain saturated hydrocarbons in the order of their boiling points, adsorbing the higher boiling propane more strongly than the lower boiling ethane and methane. The sodium zeolite A exhibits molecular sieve action and almost entirely excludes the larger propane molecule, yet permits the adsorption of ethane and methane. The methane is less strongly adsorbed than the ethane by zeolite A at this condition of pressure and temperature because of its low boiling point. These data show the feasibility of using sodium zeolite A to separate methane and ethane from mixtures with propane. Zeolite A may also be used to separate methane and ethane from mixtures of these hydrocarbons with higher homologs of the methane-ethane series and also from molecules that have maximum dimensions of their minimum projected cross-sectional area larger than that of propane, such as cyclic molecules having four or more atoms in the ring, and from gases that are not appreciably adsorbed at room temperature because of their extremely high volatility or low boiling point, such as helium, hydrogen, nitrogen and oxygen.

Table III shows that charcoal and silica gel adsorb oxygen and nitrogen at liquid air temperatures. The sieving characteristic of sodium zeolite A prevents appreciable adsorption of nitrogen, yet permits adsorption of the smaller oxygen molecule.

Table IV illustrates the lack of appreciable selectivity shown by charcoal and silica gel between normal butanol and iso-butanol. The magnesium zeolite A, however, adsorbs very long straight chain hydrocarbon and alcohol molecules, such as normal butanol, but not appreciable amounts of branched chain molecules, such as iso-butanol.

Potassium zeolite A obtained from other forms of zeolite A by exchange with a water solution of potassium chloride has a small pore size as shown by the fact that of a large number of adsorbates tested only water was adsorbed to any appreciable extent. The following table lists adsorption data for a representative sample of potassium zeolite A ($K_2A$) prepared from sodium zeolite A with about 96% replacement of the sodium ions by potassium ions.

| Adsorbate | Pressure (mm. Hg) | Temperature (° C.) | Weight percent adsorbed on $K_2A$ |
|---|---|---|---|
| Water | 0.1 | 25 | 18.3 |
| Do | 19 | 25 | 22.2 |
| Oxygen | 65 | −196 | 0.1 |
| Nitrogen | 52 | −196 | 0.1 |
| Carbon dioxide | 87 | 25 | 0.2 |
| Methanol | 70 | 25 | 2.7 |
| Ethanol | 32 | 25 | 0.2 |
| n-Propanol | 22 | 25 | 0.3 |
| i-Propanol | 40 | 25 | 0.2 |
| n-Butanol | 7 | 25 | 0.3 |
| i-Butanol | 12 | 25 | 0.5 |
| 2-butanol | 15 | 25 | 0.2 |
| Butane | 132 | 25 | 0.0 |
| i-Pentane | 126 | 25 | 0.1 |
| n-Octane | 11 | 25 | 0.0 |
| Ethylene | 244 | 25 | 0.0 |
| Butene-1 | 57 | 25 | 0.0 |
| Butene-2 | 127 | 25 | 0.1 |
| i-Butylene | 90 | 25 | 0.0 |

The sodium zeolite A, conveniently synthesized from sodium aluminate, sodium silicate and water, has a larger pore size than potassium zeolite A. The activated sodium zeolite A adsorbs water readily and adsorbs in addition somewhat larger molecules. For instance, at liquid air temperatures it adsorbs oxygen but not appreciable amounts of nitrogen as shown below for a typical sodium zeolite A sample.

| Adsorbate | Temperature (° C.) | Partial pressure (mm. Hg) | Weight percent adsorbed on $Na_2A$ |
|---|---|---|---|
| Oxygen | −196 | 100 | 24.8 |
| Nitrogen | −196 | 700 | 0.6 |

Zeolite A may be used to separate oxygen from mixtures of oxygen and other gases such as krypton, xenon and methane whose molecules are larger than oxygen. Neon, hydrogen and helium having molecules small enough to permit adsorption, may also be separated from oxygen with zeolite A since their boiling points are so low that no appreciable adsorption occurs at the temperature of liquid air.

An important property of zeolite A is the change in its sieving characteristics, particularly its selectivity, with changes in temperature. At liquid air temperatures, about −196° C., oxygen but no substantial amount of nitrogen is adsorbed. At higher temperatures, about −75° C. or higher, nitrogen is adsorbed in larger quantities than oxygen. This behavior is demonstrated by the following data:

| Adsorbate | Press. (mm. Hg) | Temp. (° C.) | Weight percent adsorbed | Press. (mm. Hg) | Temp. (° C.) | Weight percent adsorbed |
|---|---|---|---|---|---|---|
| $O_2$ | 100 | −196 | 24.8 | 750 | −75 | 4.8 |
| $N_2$ | 700 | −196 | 0.6 | 750 | −75 | 10.6 |

The preferential adsorption of nitrogen from air at −78° C. was also demonstrated in a flow system in which air at −78° C. and atmospheric pressure was passed over a bed of sodium zeolite A pellets with a superficial contact time of 25.6 seconds. The oxygen content of the exit gas rose as high as 89%, and the sorbed gas was as high as 94% nitrogen. With a short contact time of 2 to 7 seconds the first gas emerging from the bed was 100% nitrogen as a result of the more rapid rate of oxygen adsorption on freshly activated zeolite at −78° C. This, however, is a temporary condition which changes as the zeolite A approaches its capacity for oxygen at that temperature.

This inverse temperature effect was found to be quite pronounced in the case of butene-1. At 0° C. the adsorption of butene-1 on zeolite A is low but as the temperature is raised the adsorption increases as it more freely diffuses into the pores of the zeolite. At still higher temperatures the adsorption again decreases. The data are tabulated below along with similar data for ethane to show how the selectivity of sodium zeolite A for these two gases is temperature dependent.

| Adsorption temp. (° C.) | Adsorption press. (mm. Hg) | Weight percent adsorbed | |
|---|---|---|---|
| | | Butene-1 | Ethane |
| 0 | 700 | 5.3 | 8.9 |
| 75 | 700 | 10.2 | 5.6 |
| 150 | 700 | 10.1 | 1.3 |
| 350 | 700 | 3.6 | 0.0 |

At about room temperature the sodium zeolite A adsorbs the $C_1$ and $C_2$ members of the straight chain saturated hydrocarbon series but not appreciable amounts of the higher homologs. Typical results are shown below.

| Adsorbate | Temperature (° C.) | Pressure (mm. Hg) | Weight percent adsorbed on $Na_2A$ |
|---|---|---|---|
| Methane | 25 | 700 | 1.6 |
| Ethane | 25 | 700 | 7.4 |
| Propane | 25 | 700 | 0.7 |
| Butane | 25 | 132 | 0.9 |
| Octane | 25 | 12 | 0.5 |

This data suggests a process of using sodium zeolite A to remove methane and ethane from mixtures with propane and higher homologs of the series and with other larger molecules not appreciably adsorbed or with other gases less strongly adsorbed. The maximum dimension of the minimum projected cross-section for ethane is 4.0 A. and for propane 4.9 A. The sodium zeolite A adsorbs the former but not appreciable amounts of the latter.

In the series of straight chain unsaturated hydrocarbons, the $C_2$ and $C_3$ molecules are adsorbed but the higher homologs are only slightly adsorbed. This is shown in the data below for a typical sodium zeolite A. An exception is butadiene, a doubly unsaturated $C_4$.

| Adsorbate | Temperature (° C.) | Pressure (mm. Hg) | Weight percent adsorbed on $Na_2A$ |
|---|---|---|---|
| Ethylene | 25 | 200 | 8.4 |
| Propylene | 25 | 200 | 11.3 |
| Butene-1 | 25 | 200 | 2.3 |
| Butadiene | 25 | 9 | 13.7 |

This sieving action toward unsaturated hydrocarbons permits the separation of the smaller, shorter, lower molecular weight unsaturates such as ethylene, acetylene, propylene and the doubly unsaturated $C_4$ hydrocarbons from the larger, longer, heavier unsaturated and saturated hydrocarbons that are not appreciably adsorbed, or only weakly adsorbed and from gases that are only weakly adsorbed because of their low boiling points, such as $O_2$, $N_2$, $H_2$, CO and $CH_4$, and from molecules that are too large to be adsorbed such as the cyclic molecules having four or more atoms in the ring.

In the straight chain alcohol series the $C_1$—, $C_2$— and $C_3$— homologs are adsorbed by sodium zeolite A but longer ones are only slightly adsorbed as typical data shown below illustrates.

| Adsorbate | Temperature (° C.) | Pressure (mm. Hg) | Weight percent adsorbed on $Na_2A$ |
|---|---|---|---|
| Methanol | 25 | 13 | 20.0 |
| Ethanol | 25 | 7 | 18.0 |
| n-Propanol | 25 | 12 | 7.8 |
| n-Butanol | 25 | 7 | 1.8 |

Branch chain molecules, for example iso-butane and iso-butanol, are not appreciably adsorbed by sodium zeolite A nor are secondary alcohols, such as iso-propyl alcohol and secondary butanol, nor are other larger molecules, such as carbon tetrachloride, acetone or the cyclic hydrocarbons having four or more atoms in the ring, such as benzene, toluene, cyclohexane and methyl cyclohexane. This behavior of sodium zeolite A permits the separation of methanol, ethanol and propanol from longer chain normal alcohols, iso-alcohols, secondary alcohols, tertiary alcohols, cyclic hydrocarbons having four or more atoms in the ring, and all molecules whose maximum dimension of the minimum projected cross-section is as great as or larger than that of propane. Small molecules like carbon monoxide, ammonia, carbon dioxide, sulfur dioxide, hydrogen sulfide, oxygen and nitrogen are all adsorbed at room temperature on sodium zeolite A.

In borderline cases where adsorbate molecules are too large to enter the pore system of the zeolite freely, but are not large enough to be excluded entirely, there is a finite rate of adsorption and the amount adsorbed will vary with time. In general, the recorded data represents the adsorption occuring within the first one or two hours, and for some borderline molecules, further adsorption may be expected during periods of ten to fifteen hours. Washing techniques, different heat treatments and the crystal size of the sodium zeolite A powder can cause very appreciable differences in adsorption rates for the borderline molecules.

The calcium and magnesium exchanged zeolite A have molecular sieve adsorptive properties characteristic of materials with larger pores than exist in sodium zeolite A. These two forms of divalent ion exchanged zeolite A behave quite similarly and adsorb all molecules adsorbed by sodium zeolite A plus some larger molecules. For instance, in addition to adsorbing oxygen at liquid air temperature, nitrogen and krypton are also adsorbed. Typical data for an 85% exchanged calcium zeolite A, prepared from sodium zeolite A with a solution of calcium chloride are given below.

| Adsorbate | Temperature (° C.) | Pressure (mm. Hg) | Weight percent adsorbed on CaA |
|---|---|---|---|
| Oxygen | −196 | 100 | 30.7 |
| Nitrogen | −196 | 700 | 23.9 |
| Krypton [1] | −196 | 0.007 | 15.2 |

[1] This data obtained on a 66% Ca exchanged zeolite A.

At room temperature, long straight chain saturated and unsaturated hydrocarbons and alcohols are adsorbed by calcium and magnesium zeolite A but no appreciable amounts of branched chain molecules or cyclic molecules having four or more atoms in the ring are occluded. Typical data for magnesium and calcium exchanged zeolite A are given below.

| Adsorbate | Temp. (° C.) | Press. (mm. Hg) | Weight Percent Adsorbed on MgA | Press. (mm. Hg) | Weight Percent Adsorbed on CaA |
|---|---|---|---|---|---|
| n-Propane | 25 | 410 | 11.6 | 350 | 11.2 |
| n-Butane | 25 | 132 | 12.9 | 132 | 13.2 |
| n-Hexane | 25 | 31 | 14.1 | | |
| n-Heptane | 25 | 26 | 16.6 | 45 | 16.5 |
| n-Octane | 25 | 11 | 12.3 | 11 | 15.4 |
| i-Butane | 25 | 126 | 0.1 | 126 | 0.1 |
| i-Pentane | 25 | 126 | 0.1 | 126 | 0.1 |
| n-Propanol | 25 | 7.5 | 18.8 | 7.5 | 17.7 |
| n-Butanol | 25 | 13 | 17.0 | 13 | 19.4 |
| i-Propanol | 25 | 36 | 0.3 | 36 | 0.8 |
| i-Butanol | 25 | 12 | 1.2 | 12 | 1.8 |
| 2-butanol | 25 | 15 | 1.1 | 15 | 3.7 |
| Butene-1 | 25 | 57 | 14.1 | 57 | 12.7 |
| Butene-2 | 25 | 127 | 10.9 | 127 | 14.9 |
| i-Butene | 25 | 90 | 0.3 | 90 | 0.1 |
| Carbon tetrachloride | 25 | | | 46 | 0.7 |
| Benzene | 25 | | | 60 | 0.0 |
| m-Xylene | 25 | | | 6 | 0.0 |

The calcium zeolite A for which data is given above is sodium zeolite A in which 50% of the sodium ions were replaced by calcium ions.

The calcium and magnesium forms of zeolite A have a pore size that will permit adsorption of molecules for which the maximum dimension of the minimum projected cross-section is approximately 4.9 A. but not larger than about 5.5 A. The approximate maximum dimension of the minimum projected cross-section for several molecules is listed below:

Benzene _____ 5.5
Propane _____ 4.9
Ethane _____ 4.0
Iso-butane _____ 5.6

Thus calcium and magnesium zeolite A may be used for the separation of mixtures of straight chain and branched chain molecules, or for separation of straight chain molecules from cyclic compounds having four or more atoms in the ring.

Calcium and magnesium exchanged zeolite A have not only larger pores, as evidenced by their sieving action, but the total pore volume available per gram of adsorbent to a small molecule like water is greater in calcium and magnesium zeolite A than it is in sodium or potassium zeolite A.

A unique characteristic of calcium and magnesium exchanged zeolite A is that the opening of the pore to molecules larger than can be adsorbed by sodium zeolite A does not occur gradually as the sodium ions are replaced by calcium ions but rapidly in a narrow range of composition. When exchange is only 25% or less complete, the material has the sieving characteristics of sodium zeolite A, but when exchange is 40% complete, or more, the sieving characteristics are those described for calcium and magnesium zeolite A. For instance, the amount of heptane adsorbed on a sodium zeolite A sample partially exchanged with calcium is tabulated below as a function of the completion of exchange.

| Extent of Ca exchange for Na in zeolite A (percent Na ions replaced) | Weight percent heptane adsorbed at 25° C., 45 mm. Hg |
| --- | --- |
| 0 | 0.1 |
| 10 | 0.1 |
| 25 | 1.3 |
| 40 | 13.8 |
| 70 | 15.5 |
| 100 | 16.5 |

There are numerous other ion exchanged forms of zeolite A such as lithium, ammonium, silver, zinc, nickel, hydrogen, and strontium. In general, the divalent ion exchanged materials such as zinc, nickel, and strontium zeolite A have a sieving action similar to that of calcium and magnesium zeolite A, and the monovalent ion exchanged materials such as lithium and hydrogen zeolite A behave similarly to sodium zeolite A, although some differences exist.

The molecular sieving characteristics of zeolite A may be influenced by the temperature and pressure at which the adsorbent is activated, as shown by oxygen adsorption data for sodium zeolite A.

| Activation temperature (pressure<0.01 mm. Hg.) | Weight percent $O_2$ adsorbed on $Na_2A$ at −196° C. and 13 mm. Hg pressure |
| --- | --- |
| 150° C | 0.3 |
| 350° C | 20.8 |

The sample of sodium zeolite A activated at the lower temperature does not adsorb oxygen while the sample activated at the higher temperature does. This is true even though both samples adsorb over 24% by weight of water at 25° C. and 24 mm. of Hg water vapor pressure.

Similarly, the sieving characteristics of zeolite A may be altered by partially loading an activated sample with water. For example, a particular sample of sodium zeolite A adsorbed 8% ethane at 25° C. and 500 mm. of mercury pressure. Yet, when 7% by weight water was added to the activated sample, its ethane adsorption under the same conditions of temperature and pressure was reduced to less than one-tenth its former capacity. Similar altering of the sieve effect can be effected with partial loading with other adsorbates.

The molecular sieving characteristics of zeolite A can be employed in numerous processes for the separation of mixtures composed of one or more molecular species of such a size and shape as to be adsorbed and one or more species of molecules too large to be adsorbed. For instance, one and one-half grams of sodium zeolite A activated at 350° C. at a pressure equal to or less than 10 microns was put into a 2½ grams liquid mixture whose composition was 89.6% benzene and 10.4% ethanol. The solution which was at 25° C. before the addition became warm to the touch. When adsorption was complete analysis showed the liquid phase to be pure benzene, the ethanol having been adsorbed on the zeolite to the extent of 17.3% by weight.

Another unique property of zeolite A is its strong preference for polar, polarizable and unsaturated molecules, providing of course that these molecules are of a size and shape permitting them to enter the pore system of the zeolites. This is in contrast to charcoal and silica gel which show a main preference based on the volatility of the adsorbate. The following table compares the adsorptions of water, a polar molecule, $CO_2$, a polarizable molecule, and acetylene, an unsaturated molecule on charcoal, silica gel and sodium zeolite A. The table illustrates the high capacity the zeolite A has for polar, polarizable and unsaturated molecules.

| Adsorbate | Pressure (mm. Hg) | Temperature (° C.) | Weight percent adsorbed | | |
| --- | --- | --- | --- | --- | --- |
| | | | $Na_2A$ | Charcoal | Silica gel |
| Water | 0.2 | 25 | 22.1 | 0.1 | 1.6 |
| Carbon dioxide | 50 | 25 | 15.3 | 2.2 | 1.3 |
| Acetylene | 50 | 25 | 9.5 | 2.5 | 2.1 |

The selectivity of the sodium zeolite A for polar over non-polar molecules is shown by adsorption data for the polar carbon monoxide molecule and the non-polar oxygen molecule at −75° C.

| Adsorbate | Weight percent adsorbed at 500 mm. Hg pressure |
| --- | --- |
| Oxygen | 5.5 |
| Carbon monoxide | 11.5 |

Both of these adsorbates have similar boiling points and are essentially the same size.

The greater the degree of polarity, polarizability and unsaturation, the greater the affinity of zeolite A for the adsorbate. This is illustrated in the following tables with a series of $C_2$ hydrocarbons on sodium zeolite A and $C_3$ hydrocarbons on calcium zeolite A.

| Pressure (mm. Hg) | Temperature (° C.) | Weight percent adsorbed on $Na_2A$ | | |
| --- | --- | --- | --- | --- |
| | | $C_2H_6$ | $C_2H_4$ | $C_2H_2$ |
| 1 | 25 | 0.4 | 1.7 | 4.7 |
| 5 | 25 | 1.2 | 4.3 | 6.6 |
| | | Weight percent adsorbed on CaA | | |
| | | $C_3H_8$ | $C_3H_6$ | |
| 2 | 25 | 4.1 | 8.1 | |
| 49 | 25 | 8.0 | 12.1 | |
| 201 | 25 | 9.3 | 12.9 | |

These data, indicating strong adsorption for the unsaturated molecules, show that unsaturated molecules may be separated from saturated molecules or less unsaturated molecules even though all are of approximately the same size and small enough to enter the pore system of zeolite A. Specifically, it shows a propensity for separating acetylene from both ethylene and ethane and from other saturated hydrocarbons, such as methane and propane, and from molecules that are less strongly adsorbed because of their low boiling points, such as nitrogen, oxygen, hydrogen, and carbon monoxide.

A selectivity for polar, polarizable and unsaturated molecules is not new among adsorbents. Silica gel exhibits some preference for such molecules, but the extent of this selectivity is so much greater with zeolite A that separation processes based upon this selectivity become feasible. For example, if a sample of activated sodium zeolite A is brought to equilibrium at one atmosphere of pressure and 25° C. with a gas mixture composed of 20% ethylene and 80% ethane, the adsorbed phase contains more than six times as much ethylene as ethane. Silica gel on the other hand has more ethane than ethylene in the adsorbed phase under similar conditions.

The selectivity for polar, polarizable and unsaturated molecules can be altered appreciably by ion exchange and in addition relative selectivities may change with temperature. Such effects are illustrated with the small carbon monoxide molecule on sodium, calcium, and magnesium zeolite A at −75° C. and 0° C.

| Adsorbent | Weight percent CO Adsorbed at 700 mm. Hg | |
|---|---|---|
| | −75° C. | 0° C. |
| Na₂A | 11.4 | 5.5 |
| CaA | 15.3 | 7.0 |
| MgA | 12.5 | 3.7 |

Zeolite A shows a selectivity for adsorbates, provided that they are small enough to enter the porous network of the zeolites, based on the boiling points of the adsorbates, as well as on their polarity, polarizability or degree of unsaturation. For instance, hydrogen which has a low boiling point is not strongly adsorbed at room temperature. A non-polar saturated ethane molecule is somewhat more strongly adsorbed at room temperature than the polar carbon monoxide molecule because the effect of the much lower boiling point of carbon monoxide, −192° C. as compared to −88° C. for ethane, more than counterbalances the polarity effect.

A further important characteristic of zeolite A is its property of adsorbing large amounts of adsorbates at low adsorbate pressures, partial pressures or concentrations. This property makes zeolite A uniquely useful in the more complete removal of adsorbable impurities from gas and liquid mixtures. It gives them a relatively high adsorption capacity even when the material being adsorbed from a mixture is present in very low concentrations, and permits the efficient recovery of minor components of mixtures. This characteristic is all the more important since adsorption processes are most frequently used when the desired component is present in low concentrations or low partial pressures. High adsorptions at low pressures or concentrations on zeolite A are illustrated in the following table, along with some comparative data for silica gel and charcoal.

| Adsorbate | Temperature (°C.) | Pressure (mm. Hg) | Weight percent adsorbed | | | | |
|---|---|---|---|---|---|---|---|
| | | | Na₂A | CaA | MgA | Charcoal | Silica gel |
| H₂O | 25 | 0.02 | 12.5 | 13.7 | | 0.4 | 0.7 |
| | 25 | 0.1 | 21.0 | 20.3 | | | 1.2 |
| | 25 | 4.5 | 25.3 | 27.3 | 29.8 | 2.7 | 11.4 |
| | 25 | ¹P₀ | 28.9 | 32.0 | 35.3 | 24.1 | 42.9 |
| CO₂ | 25 | 1.6 | 5.9 | 5.9 | 5.3 | 0.5 | 0.5 |
| | 25 | 80 | 15.0 | 19.5 | 15.0 | 2.3 | 0.6 |
| | 25 | 750 | 18.9 | 24.4 | 22.2 | 10.0 | 4.6 |
| SO₂ | 25 | 0.02 | 9.4 | 9.9 | 5.4 | | |
| | 25 | 0.7 | 23.3 | 24.9 | 20.1 | 1.7 | |
| | 25 | 12 | 27.6 | 30.8 | 28.8 | 10.7 | |
| | 25 | 696 | 32.9 | 36.6 | 33.2 | 61.6 | |
| H₂S | 25 | 0.5 | 8.5 | 12.7 | 6.6 | | |
| | 25 | 11 | 16.4 | 21.0 | 15.2 | | |
| | 25 | 198 | 23.7 | 29.3 | 25.9 | | |
| NH₃ | 25 | 0.6 | 5.9 | 7.9 | 10.5 | 0.3 | 1.9 |
| | 25 | 9 | 11.8 | 14.3 | 14.2 | 0.4 | 5.9 |
| | 25 | 700 | 17.6 | 19.5 | 18.6 | 8.3 | 12.9 |
| CO | 0 | 50 | | 2.8 | 1.7 | | |
| | 0 | 298 | | 5.3 | 2.7 | | |
| | 0 | 750 | | 7.0 | 3.7 | | |
| C₂H₂ | 25 | 10 | 8.2 | | | 1.3 | 1.2 |
| | 25 | 200 | 10.2 | | | 3.8 | 2.2 |
| C₂H₄ | 25 | 10 | 6.8 | | | 3.4 | 1.8 |
| | 25 | 100 | 10.0 | | | 5.9 | 2.4 |
| | 25 | 750 | 10.3 | | | 11.5 | 4.3 |
| CO₂ | 0 | 50 | 17 | | | | |
| | 0 | 600 | 21.8 | | | | |
| O₂ | 0 | 50 | 0.1 | | | | |
| | 0 | 600 | 0.8 | | | | |
| N₂ | 0 | 50 | 0.7 | | | | |
| | 0 | 600 | 2.0 | | | | |
| CO | 0 | 50 | 0.9 | | | | |
| | 0 | 600 | 5.6 | | | | |
| H₂ | 0 | 600 | 0.0 | | | | |
| CH₄ | 0 | 600 | 2.1 | | | | |

¹ P₀ = the vapor pressure of water at the temperature given.

The strong adsorption of water by zeolite A at low pressures can be capitalized on to remove water from mixtures with other materials. The high adsorptive capacity by zeolite A for carbon dioxide as compared to that for carbon monoxide, oxygen, nitrogen, hydrogen, methane, and ethane renders zeolite A suitable for use in the separation of carbon dioxide from mixtures with these gases. Similarly hydrogen sulfide, sulfur dioxide, and ammonia may be separated by zeolite A from mixtures of these gases with oxygen, nitrogen, hydrogen, carbon monoxide, and carbon dioxide.

The adsorption capacity of adsorbents usually decreases with increasing temperature, and while the adsorption capacity of an adsorbent at a given temperature may be sufficient, the capacity may be wholly unsatisfactory at a higher temperature. With zeolite A a relatively high capacity may be retained at higher temperatures. For instance, adsorption data for water on calcium zeolite A and silica gel at 25° C. and 100° C. are tabulated below. It is seen that the capacity of calcium zeolite A remains high even at 100° C.

| Pressure (Mm. Hg) | Weight percent adsorbed at 25° C. | | Pressure (mm. Hg) | Weight percent adsorbed at 100° C. | |
|---|---|---|---|---|---|
| | Silica gel | CaA | | Silica gel | CaA |
| 0.1 | 1.2 | 20.3 | 0.6 | 0.2 | 11.3 |
| 4.5 | 11.4 | 27.3 | 4.5 | 0.6 | 16.9 |
| P₀¹ | 42.9 | 32.0 | ¹P₀ | 1.5 | 20.5 |

¹ P₀ = the vapor pressure of water at 25° C.

Zeolite A may be activated by heating it in either air, a vacuum, or other appropriate gas to temperatures of as high as 600° C. The conditions used for desorption of an adsorbate from zeolite A vary with the adsorbate, but either raising the temperature and reducing the pressure, partial pressure or concentration of the adsorbate in contact with the adsorbent or a combination of these steps is usually employed. Another method is to displace the adsorbate by adsorption of another more strongly held adsorbate. For instance, carbon monoxide adsorbed on a bed of zeolite A at 25° C. has been displaced by the adsorption of either carbon dioxide or acetylene at 25° C.

Zeolite A may be used as an adsorbent for the purposes indicated above in any suitable form. For example, a column of powdered crystalline material has given excellent results as has a pelleted form obtained by pressing into pellets a mixture of zeolite A and a suitable bonding agent such as clay.

What is claimed is:

1. A crystalline synthetic material having a composition expressed in terms of oxides as follows:

$$1.0 \pm 0.2 M_{\frac{2}{n}}O : Al_2O_3 : 1.85 \pm 0.5 SiO_2 : YH_2O$$

wherein "M" represents at least one of the materials in the group consisting of hydrogen, ammonium, metals in groups I and II of the periodic table, and the transition metals of the periodic table, "n" represents the valence of "M," and "Y" may be any value up to about 6, the atoms of said material being arranged in a unit cell in such a manner that the X-ray powder diffraction pattern of the material is essentially the same as that shown in Table A.

2. A crystalline synthetic material having a composition expressed in terms of oxides as follows:

$$1.0 \pm 0.2 M_{\frac{2}{n}}O : Al_2O_3 : 1.85 \pm 0.5 SiO_2 : YH_2O$$

wherein "M" represents at least one of the materials in the group consisting of hydrogen, ammonium, metals in groups I and II of the periodic table, and the transition metals of the periodic table, "n" represents the valence of "M," and "Y" may be any value up to about 6, the atoms of said material being arranged in a unit cell in such a manner that the X-ray powder diffraction pattern of the material is essentially the same as that shown in Table B.

3. Crystalline synthetic sodium aluminum silicate the atoms of which are arranged in a unit cell in such a manner that the X-ray powder diffraction pattern of the silicate is essentially the same as that shown in Table A for sodium zeolite A.

4. Crystalline synthetic sodium aluminum silicate the atoms of which are arranged in a unit cell in such a manner that the X-ray powder diffraction pattern of the silicate is essentially the same as that shown in Table B.

5. Crystalline synthetic sodium aluminum silicate the atoms of which are arranged in a unit cell in such a manner that the X-ray powder diffraction pattern of the silicate is essentially the same as that shown in Table A, at least a portion of the sodium ions in the silicate being replaced by at least one of the cations in the group consisting of hydrogen, ammonium, metals in groups I and II of the periodic table, and the transition metals of the periodic table.

6. Crystalline synthetic sodium aluminum silicate the atoms of which are arranged in a unit cell in such a manner that the X-ray powder diffraction pattern of the silicate is essentially the same as that shown in Table B, at least a portion of the sodium ions in the silicate being replaced by at least one of the cations in the group consisting of hydrogen, ammonium, metals in groups I and II of the periodic table, and the transition metals of the periodic table.

7. Crystalline synthetic sodium aluminum silicate the atoms of which are arranged in a unit cell in such a manner that the X-ray powder diffraction pattern of the silicate is essentially the same as that shown in Table A, at least a portion of the sodium ions in the silicate being replaced by calcium.

8. Crystalline synthetic sodium aluminum silicate the atoms of which are arranged in a unit cell in such a manner that the X-ray powder diffraction pattern of the silicate is essentially the same as that shown in Table B, at least a portion of the sodium ions in the silicate being replaced by calcium.

9. Crystalline synthetic sodium aluminum silicate the atoms of which are arranged in a unit cell in such a manner that the X-ray powder diffraction pattern of the silicate is essentially the same as that shown in Table A, at least a portion of the sodium ions in the silicate being replaced by potassium.

10. Crystalline synthetic sodium aluminum silicate the atoms of which are arranged in a unit cell in such a manner that the X-ray powder diffraction pattern of the silicate is essentially the same as that shown in Table B, at least a portion of the sodium ions in the silicate being replaced by potassium.

11. Crystalline synthetic sodium aluminum silicate the atoms of which are arranged in a unit cell in such a manner that the X-ray powder diffraction pattern of the silicate is essentially the same as that shown in Table A, at least a portion of the sodium ions in the silicate being replaced by magnesium.

12. Crystalline synthetic sodium aluminum silicate the atoms of which are arranged in a unit cell in such a manner that the X-ray powder diffraction pattern of the silicate is essentially the same as that shown in Table B, at least a portion of the sodium ions in the silicate being replaced by magnesium.

13. Crystalline synthetic sodium aluminum silicate the atoms of which are arranged in a unit cell in such a manner that the X-ray powder diffraction pattern of the silicate is essentially the same as that shown in Table A, at least a portion of the sodium ions in the silicate being replaced by hydrogen.

14. Crystalline synthetic sodium aluminum silicate the atoms of which are arranged in a unit cell in such a manner that the X-ray powder diffraction pattern of the silicate is essentially the same as that shown in Table B, at least a portion of the sodium ions in the silicate being replaced by hydrogen.

15. Crystalline synthetic sodium aluminum silicate the atoms of which are arranged in a unit cell in such a manner that the X-ray powder diffraction pattern of the silicate is essentially the same as that shown in Table A, at least a portion of the sodium ions in the silicate being replaced by ammonium.

16. Crystalline synthetic sodium aluminum silicate the atoms of which are arranged in a unit cell in such a manner that the X-ray powder diffraction pattern of the silicate is essentially the same as that shown in Table B, at least a portion of the sodium ions in the silicate being replaced by ammonium.

17. A crystalline synthetic metal-aluminum-silicate the sodium exchanged form of which has a composition expressed in terms of oxides as follows:

$$1.0 \pm 0.2 Na_2O : Al_2O_3 : 1.85 \pm 0.5 SiO_2 : YH_2O$$

wherein "Y" may be any value up to about 5.1, said sodium exchanged form of said silicate having an arrangement of atoms such that the X-ray powder diffraction pattern of the silicate is essentially the same as that shown in Table A for sodium zeolite A, said exchanged form of said silicate being further characterized in that at a temperature of about −196° C. the dehydrated crystal adsorbs substantial quantities of oxygen but less than about 2% by weight of nitrogen.

18. A crystalline synthetic metal-aluminum-silicate the sodium exchanged form of which has a composition expressed in terms of oxides as follows:

$$1.0 \pm 0.2 Na_2O : Al_2O_3 : 1.85 \pm 0.5 SiO_2 : YH_2O$$

wherein "Y" may be any value up to about 5.1, said silicate having an arrangement of atoms such that the X-ray powder diffraction pattern of the silicate is essentially the same that shown in Table B, said exchanged form of said silicate being further characterized in that at a temperature of about −196° C. the dehydrated crystal adsorbs substantial quantities of oxygen but less than about 2% by weight of nitrogen.

19. A crystalline synthetic metal-aluminum-silicate the calcium exchanged form of which has a composition expressed in terms of oxides as follows:

$$1.0 \pm 0.2 CaO : Al_2O_3 : 1.85 \pm 0.5 SiO_2 : YH_2O$$

wherein "Y" may be any value up to about 5, said calcium exchanged form of said silicate having an arrangement of atoms such that the X-ray powder diffraction pattern of the silicate is essentially the same as that shown in Table A for calcium zeolite A, said exchanged form of said silicate being further characterized in that at a temperature of about 25° C., the dehydrated crystal absorbs substantial quantities of butane but less than about 2% by weight of iso-butane.

20. A crystalline synthetic metal-aluminum-silicate the calcium exchanged form of which has a composition expressed in terms of oxides as follows:

$$1.0 \pm 0.2 Ca_2O : Al_2O_3 : 1.85 \pm 0.5 SiO_2 : YH_2O$$

wherein "Y" may be any value up to about 5, said calcium exchanged form of said silicate having an arrangement of atoms such that the X-ray powder diffraction pattern of the silicate is essentially the same as that shown in Table B for calcium zeolite A, said exchanged form of said silicate being further characterized in that at a temperature of about 25° C., the dehydrated crystal adsorbs substantial quantities of butane but less than about 2% by weight of iso-butane.

21. Method of preparing a sodium-aluminum-silicate having atoms arranged in a unit cell in such a manner that the X-ray powder diffraction pattern of the silicate is essentially the same as that shown in Table A, which comprises preparing a sodium-aluminum-silicate water mixture whose composition, expressed in terms of oxide-mole ratios, falls with the ranges:

$Na_2O/SiO_2$ ratio from 1.0 to 3.0 and a
$H_2O/Na_2O$ ratio from 35–200 when the
$SiO_2/Al_2O_3$ ratio is from 0.5 to 1.3; a
$NaO/SiO_2$ ratio from 0.8 to 3.0 and a
$H_2O/Na_2O$ ratio from 35 to 200 when the
$SiO_2/Al_2O_3$ ratio is from 1.3 to 2.5;

maintaining the mixture at a temperature within the range from about 20° C. to 175° C. until crystals as previously defined are formed; and separating the crystals from the mother liquor.

22. Method of preparing a sodium-aluminum-silicate having atoms arranged in a unit cell in such a manner that the X-ray powder diffraction pattern is essentially the same as that shown in Table B, which comprises preparing a sodium-aluminum-silicate water mixture whose composition, expressed in terms of oxide-mole ratios, falls with the ranges:

$Na_2O/SiO_2$ ratio from 1.0 to 3.0 and a
$H_2O/Na_2O$ ratio from 35–200 when the
$SiO_2/Al_2O_3$ ratio is from 0.5 to 1.3; a
$Na_2O/SiO_2$ ratio from 0.8 to 3.0 and a
$H_2O/Na_2O$ ratio from 35 to 200 when the
$SiO_2/Al_2O_3$ ratio is from 1.3 to 2.5;

maintaining the mixture at a temperature within the range from about 20° C. to 175° C. until crystals as previously defined are formed; and separating the crystals from the mother liquor.

23. Method of preparing a sodium-aluminum-selicate having atoms arranged in a unit cell in such a manner that the X-ray powder diffraction pattern of the silicate is essentially the same as that shown in Table A, which comprises preparing a sodium-aluminum-silicate water mixture whose composition, expressed in terms of oxide-mole ratios, falls with the ranges:

$Na_2O/SiO_2$ ratio from 1.0 to 3.0 and a
$H_2O/Na_2O$ ratio from 35–200 when the
$SiO_2/Al_2O_3$ ratio is from 0.5 to 1.3;

maintaining the mixture at a temperature within the range from about 20° C. to 175° C. until crystals as previously defined are formed; and separating the crystals from the mother liquor.

24. Method of preparing a sodium-aluminum-silicate having atoms arranged in a unit cell in such a manner that the X-ray powder diffraction pattern of the silicate is essentially the same as that shown in Table A, which comprises preparing a sodium-aluminum-silicate water mixture whose composition, expressed in terms of oxide-mole ratios, falls with the ranges:

$Na_2O/SiO_2$ ratio from 0.8 to 3.0 and a
$H_2O/Na_2O$ ratio from 35 to 200 when the
$SiO_2/Al_2O_3$ ratio is from 1.3 to 2.5;

maintaining the mixture at a temperature within the range from about 20° C. to 175° C. until crystals as previously defined are formed; and separating the crystals from the mother liquor.

References Cited in the file of this patent

UNITED STATES PATENTS

| | | |
|---|---|---|
| 1,682,588 | Wietzel | Aug. 28, 1928 |
| 1,906,203 | Bruce | Apr. 25, 1933 |
| 2,137,605 | Derr | Nov. 22, 1938 |
| 2,306,610 | Barrer | Dec. 29, 1942 |
| 2,413,134 | Barrer | Dec. 24, 1946 |
| 2,512,053 | Calmon | June 20, 1950 |
| 2,617,712 | Bond | Nov. 11, 1952 |

FOREIGN PATENTS

| | | |
|---|---|---|
| 574,911 | Great Britain | Jan. 25, 1946 |

OTHER REFERENCES

Mellor: "Comprehensive Treatise on Inorganic and Theoretical Chemistry," vol. 6, 1925, pages 567, 568, 576–579, Longmans, Green and Co., N.Y., N.Y.

Synthesis of Zeolitic Mineral, Barrer, Chemical Society Journal, London, 1948, pages 127–143.

Barrer et al.: The Hydrothermal Chemistry of Silicates, part II, Article in the Journal of Chemical Society, 1952, pp. 1561–1571.

Physical Chemistry of the Silicates, Eitel, University of Chicago Press, 1954, pages 994–1021.